(12) United States Patent
Kobayashi et al.

(10) Patent No.: US 6,633,512 B1
(45) Date of Patent: Oct. 14, 2003

(54) MAGNETO-OPTICAL INFORMATION STORAGE APPARATUS AND INFORMATION STORAGE METHOD WITH FUNCTION OF UPDATING DEFAULT VALUE OF APPLIED MAGNETIC FIELD

(75) Inventors: Shinya Kobayashi, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/791,175

(22) Filed: Feb. 22, 2001

(30) Foreign Application Priority Data

Jul. 6, 2000 (JP) ........................................ 2000-205284

(51) Int. Cl.⁷ .............................................. G11B 11/14
(52) U.S. Cl. .................................. 369/13.03; 369/13.14
(58) Field of Search ........................... 369/13.14–13.22, 369/53.17

(56) References Cited

U.S. PATENT DOCUMENTS

| | | | | | |
|---|---|---|---|---|---|
| 4,979,158 A | * | 12/1990 | Yoda | ........................ | 369/13.22 |
| 5,029,155 A | * | 7/1991 | Kenjo | ......................... | 369/116 |
| 5,233,584 A | * | 8/1993 | Kulakowski et al. | ..... | 369/44.27 |
| 5,383,175 A | * | 1/1995 | Finkelstein et al. | ...... | 369/116 X |
| 5,394,380 A | * | 2/1995 | Hasegawa | ................. | 369/13.22 |
| 5,418,770 A | * | 5/1995 | Ide et al. | .................... | 369/116 |
| 5,446,716 A | * | 8/1995 | Eastman et al. | ......... | 369/116 X |
| 5,668,787 A | * | 9/1997 | Shigematsu et al. | ..... | 369/13.02 |
| 5,677,899 A | * | 10/1997 | Getreuer | .................. | 369/44.28 |
| 5,721,816 A | * | 2/1998 | Kusbel et al. | ............ | 369/44.27 |
| 5,732,055 A | * | 3/1998 | Masaki et al. | ............ | 369/53.26 |
| 5,903,537 A | * | 5/1999 | Gage et al. | ................. | 369/116 |
| 5,970,026 A | * | 10/1999 | Wachi et al. | ............. | 369/13.22 |
| 6,072,761 A | * | 6/2000 | Tani | ............................ | 369/116 |
| 6,249,490 B1 | * | 6/2001 | Miyaoka et al. | | |
| 6,275,462 B1 | * | 8/2001 | Masaki et al. | .............. | 369/116 |
| 6,381,725 B1 | * | 4/2002 | Isokawa | ..................... | 714/769 |
| 6,469,960 B1 | * | 10/2002 | Miyoshi | .................. | 369/13.14 |

FOREIGN PATENT DOCUMENTS

| | | | | | |
|---|---|---|---|---|---|
| JP | 2000182292 | | 6/2000 | | |
| JP | 2000-182292 | * | 6/2000 | ........... | G11B/11/10 |

OTHER PUBLICATIONS

MAT (Machine Assisted Translation) of JP 2000–182292.*

* cited by examiner

*Primary Examiner*—Aristotelis M. Psitos
(74) *Attorney, Agent, or Firm*—Greer, Burns & Crain, Ltd.

(57) ABSTRACT

The present invention provides an information storage apparatus which at least records information by applying a magnetic field to a recording medium with a smaller power consumption. A default value of a recording magnetic field is set to a minimum value of the apparatus. Through a learning process, the default value of the recording magnetic field is changed to a value in the vicinity of the minimum value.

17 Claims, 17 Drawing Sheets

FIG.4

| ZONE | E/W MAGNETIC FIELD DEFAULT VALUE | R MAGNETIC FIELD DEFAULT VALUE | LASER POWER DEFAULT VALUE | LASER POWER DEFAULT VALUE |
|---|---|---|---|---|
| Z1 | H11 | H21 | $P_W1$ | $P_R1$ |
| Z2 | H12 | H22 | $P_W2$ | $P_R2$ |
| ... | ... | ... | ... | ... |
| Zn | H1n | H2n | $P_Wn$ | $P_Rn$ |

| ZONE | E/W MAGNETIC FIELD OFFSET VALUE | R MAGNETIC FIELD OFFSET VALUE | LASER POWER OFFSET VALUE | LASER POWER OFFSET VALUE |
|---|---|---|---|---|
| Z1 | $\Delta H_{11}$ | $\Delta H_{21}$ | $\Delta P_W 1$ | $\Delta P_R 1$ |
| Z2 | $\Delta H_{12}$ | $\Delta H_{22}$ | $\Delta P_W 2$ | $\Delta P_R 2$ |
| ... | ... | ... | ... | ... |
| Zn | $\Delta H_{1n}$ | $\Delta H_{2n}$ | $\Delta P_W n$ | $\Delta P_R n$ |

| NUMBER OF RETRIES | MAGNETIC FIELD OFFSET VALUE |
|---|---|
| 1 | $\Delta H31$ |
| 2 | $\Delta H32$ |
| ⋮ | ⋮ |
| m | $\Delta H3m$ |

| TEMPERATURE | MAGNETIC FIELD OFFSET VALUE |
|---|---|
| 0°C～10°C | $\Delta H41$ |
| 10°C～20°C | $\Delta H42$ |
| 20°C～30°C | $\Delta H43$ |
| 30°C～40°C | $\Delta H44$ |
| 40°C～50°C | $\Delta H45$ |
| 50°C～60°C | $\Delta H46$ |

FIG.17

| AREA | E/W MAGNETIC FIELD DEFAULT VALUE | R MAGNETIC FIELD DEFAULT VALUE | LASER POWER DEFAULT VALUE | LASER POWER DEFAULT VALUE |
|---|---|---|---|---|
| A1 | H11 | H21 | $P_W 1$ | $P_R 1$ |
| A2 | H12 | H22 | $P_W 2$ | $P_R 2$ |
| ... | ... | ... | ... | ... |
| An | H1n | H2n | $P_W n$ | $P_R n$ |

| AREA | E/W MAGNETIC FIELD OFFSET VALUE | R MAGNETIC FIELD OFFSET VALUE | LASER POWER OFFSET VALUE | LASER POWER OFFSET VALUE |
|---|---|---|---|---|
| A1 | $\Delta H11$ | $\Delta H21$ | $\Delta P_W 1$ | $\Delta P_R 1$ |
| A2 | $\Delta H12$ | $\Delta H22$ | $\Delta P_W 2$ | $\Delta P_R 2$ |
| ... | ... | ... | ... | ... |
| An | $\Delta H1n$ | $\Delta H2n$ | $\Delta P_W n$ | $\Delta P_R n$ |

64

MAGNETO-OPTICAL INFORMATION STORAGE APPARATUS AND INFORMATION STORAGE METHOD WITH FUNCTION OF UPDATING DEFAULT VALUE OF APPLIED MAGNETIC FIELD

BACKGROUND OF THE INVENTION

1. Field of the Invention

The present invention generally relates to information storage apparatuses and information storage methods, and, more particularly, to an information storage apparatus that performs recording by applying a magnetic field to a recording medium.

2. Description of the Related Art

In recent years, there has been a demand for effective power saving techniques in the field of information processing. Particularly, in a magneto-optical disk apparatus, a laser beam and a magnetic field need to be produced for recording and/or reproducing information, and a relatively large power is required.

Meanwhile, in a case where a magneto-optical disk apparatus is mounted on a mobile personal computer or the like, a battery may be employed as a power source. In such a case, the battery wears out when a large amount of power is consumed, resulting in a short driving time. Therefore, it is desirable to reduce the power consumption.

To perform a data write operation in a magneto-optical disk apparatus, an erasing process, a writing process, and a verifying process are performed in that order. In the erasing process, the data in a range in which data is to be written is erased. In the writing process, the data is written in the erase range. In the verifying process, the written data is read out to determine whether or not the writing has been correctly performed.

In the erasing process and the writing process, a magnetic field is applied to the magneto-optical disk, but also a laser beam is emitted onto the magneto-optical disk. In regard to the positional relationship of the magnetic field to be applied, the magneto-optical disk should be adjusted so that the laser beam and the magnetic field are at right angles to the magneto-optical disk. In practical use, however, the magneto-optical disk is chucked with a tilt due to mechanical tolerance, or the mounted lens might be tilted. Consequently, it is very difficult to maintain an ideal positional relationship. The magnetic field is thus set to a large value so that the data write operation can positively be performed even if the relative positional relationships among the laser beam, the magneto-optical disk, and the magnetic field falls under a worst case.

However, with such a large magnetic field, there is a problem that the power consumption becomes large.

SUMMARY OF THE INVENTION

A general object of the present invention is to provide information storage apparatuses and methods in which the above problems are eliminated.

A more specific object of the present invention is to provide an information storage apparatus that can reduce power consumption, and a method of recording information with a small amount of power consumption.

According to the present invention, when information is recorded by applying a magnetic field to a recording medium, a control value for controlling the magnitude of the magnetic field generated by a magnetic field generating unit is set within a control range of a predetermined magnetic field. The initial value of the control value is pre-stored, and the initial value is updated to a new control value within the control range depending on error conditions.

With such an information recording apparatus, it is not necessary to set a bias magnetic field for each process to a maximum value, which takes into consideration the tolerance. A default value of the magnetic field may be set, if necessary, so as to minimize the default value and the control range of the magnetic field, depending on the relative relationship of a light beam, the recording medium, and the magnetic field.

The above and other objects and features of the present invention will become more apparent from the following description taken in conjunction with the accompanying drawings.

BRIEF DESCRIPTION OF THE DRAWINGS

FIG. 4 shows the data structure of a default data table in one embodiment of the present invention;

FIG. 5 shows the data structure of a test write offset table in one embodiment of the present invention;

FIG. 6 shows the data structure of a retry offset table in one embodiment of the present invention;

FIG. 7 shows the data structure of a temperature offset table in one embodiment of the present invention;

FIG. 17 shows the data structure of a modification of the default table of the present invention; and FIG. 18 shows the data structure of a modification of the offset table of the present invention.

DESCRIPTION OF THE PREFERRED EMBODIMENTS

The following is a description of embodiments of the present invention, with reference to the accompanying drawings.

Figure 1:
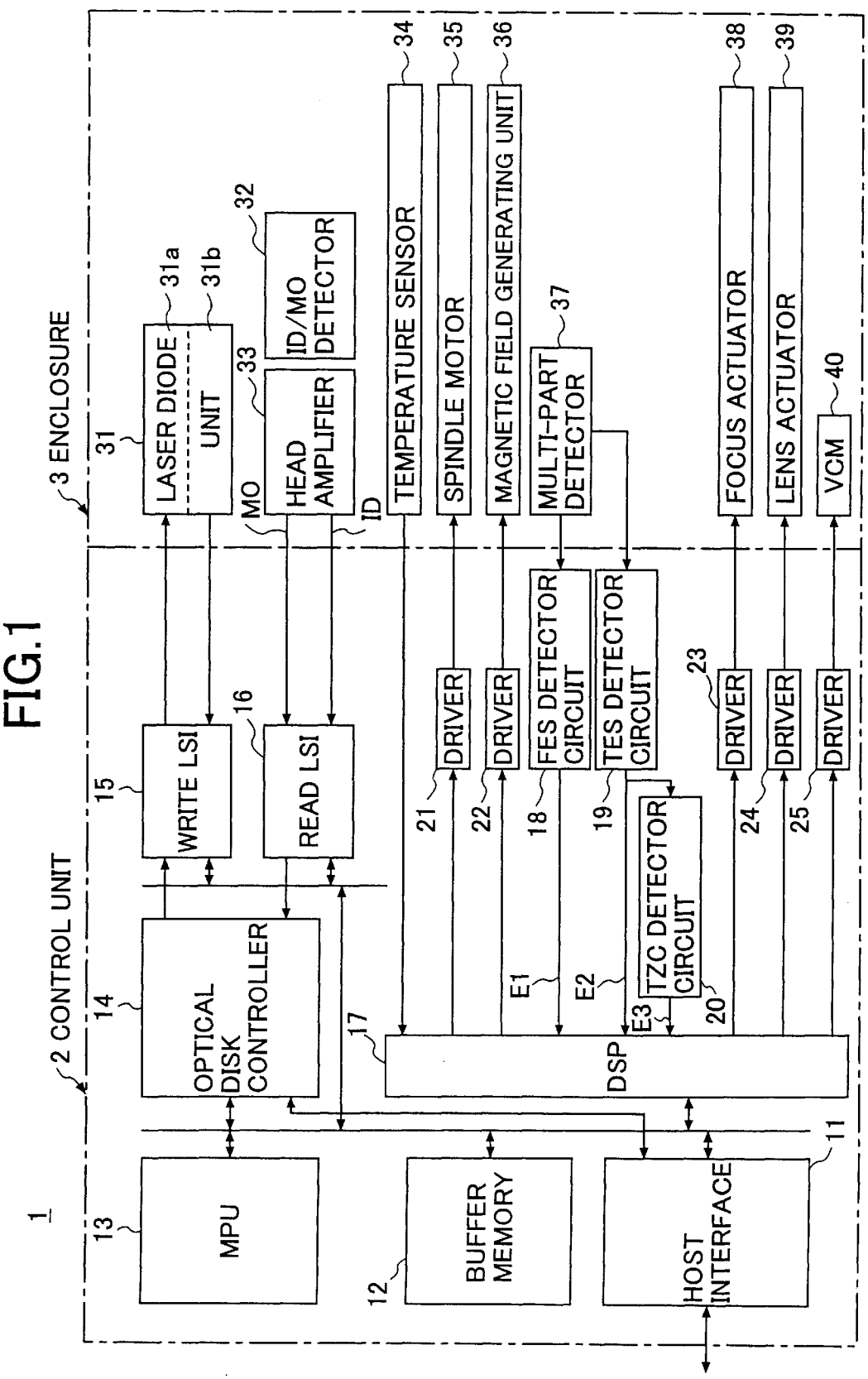
FIG. 1 is a block diagram of an information storage apparatus in accordance with the present invention.

FIG. 1 is a block diagram of an information storage apparatus of one embodiment of the present invention.

An information storage apparatus 1 of this embodiment comprises a control unit 2 and an enclosure 3.

The control unit 2 comprises an interface 11, a buffer memory 12, an MPU 13, an optical disk controller (ODC) 14, a write LSI 15, a read LSI 16, a DSP 17, a focusing error signal detector circuit 18, a tracking error signal detector circuit 19, a track zero-cross detector circuit 20, and drivers 21 to 25. The enclosure 3 comprises a laser diode unit 31, an ID/MO detector 32, a head amplifier 33, a temperature sensor 34, a spindle motor 35, a magnetic field generating unit 36, a multi-part detector 37 having a plurality of detector parts, a focusing actuator 38, a lens actuator 39, and a voice coil motor (VCM) 40.

The interface 11 exchanges commands and data with a host apparatus. The buffer memory 12 is shared among the interface 11, the MPU 13, and the optical disk controller 14, and is used as a work storage area.

The MPU 13 controls the entire information storage apparatus 1. The optical disk controller 14 performs necessary operations for reading and writing of data on and from a magneto-optical (MO) disk medium.

The write LSI 15 includes a write modulation circuit and a laser diode control circuit, and converts write data supplied from the optical disk controller 14 into PPM recording data or PWM recording data. The write LSI 15 then supplies the converted data to the laser diode unit 31. The laser diode unit 31 contains a laser diode 31a and a monitor detector 31b. The laser diode 31a emits light based on data supplied from the write LSI 15. The monitor detector 31b detects the amount of light emitted from the laser diode 31a, and then supplies it to the write LSI 15.

The read LSI 16 contains a read demodulation circuit and a frequency synthesizer, and produces a read clock signal and read data from an ID signal and an MO signal supplied from the enclosure 3, thereby demodulating the original data. The DSP 17 performs various servo control operations, based on a temperature detection signal, a focusing error signal, a tracking error signal, and a zero-cross signal supplied from the enclosure 3. The focusing error signal detection circuit 18 detects a focusing error signal based on a detection signal from the multi-part detector 37 of the enclosure 3. The tracking error signal detection circuit 19 detects the tracking error signal based on a detection signal supplied from the multi-part detector 37 of the enclosure 3.

The driver 21 drives the spindle motor 35 in accordance with a drive signal supplied from the DSP 17. The driver 22 drives the magnetic field generating unit 36 in accordance with a magnetic field producing signal supplied from the DSP 17.

The magnetic field generating unit 36 is formed by an electromagnet, and can change a magnetic field applied to a magneto-optical disk depending on a drive signal supplied from the driver 22. The magnetic field generating unit 36 is a magnetic head having a coil wound around a magnetic pole, and can be a floating-type that floats from the medium or a contact-type that is in contact with the medium.

The driver 23 drives the focusing actuator 38 in accordance with a focusing control signal supplied from the DSP 17. The driver 24 drives the lens actuator 39 in accordance with the tracking control signal supplied from the DSP 17. The driver 25 drives the VCM 40 in accordance with the VCM control signal supplied from a VCM control signal supplied from the DSP 17.

Figure 2:
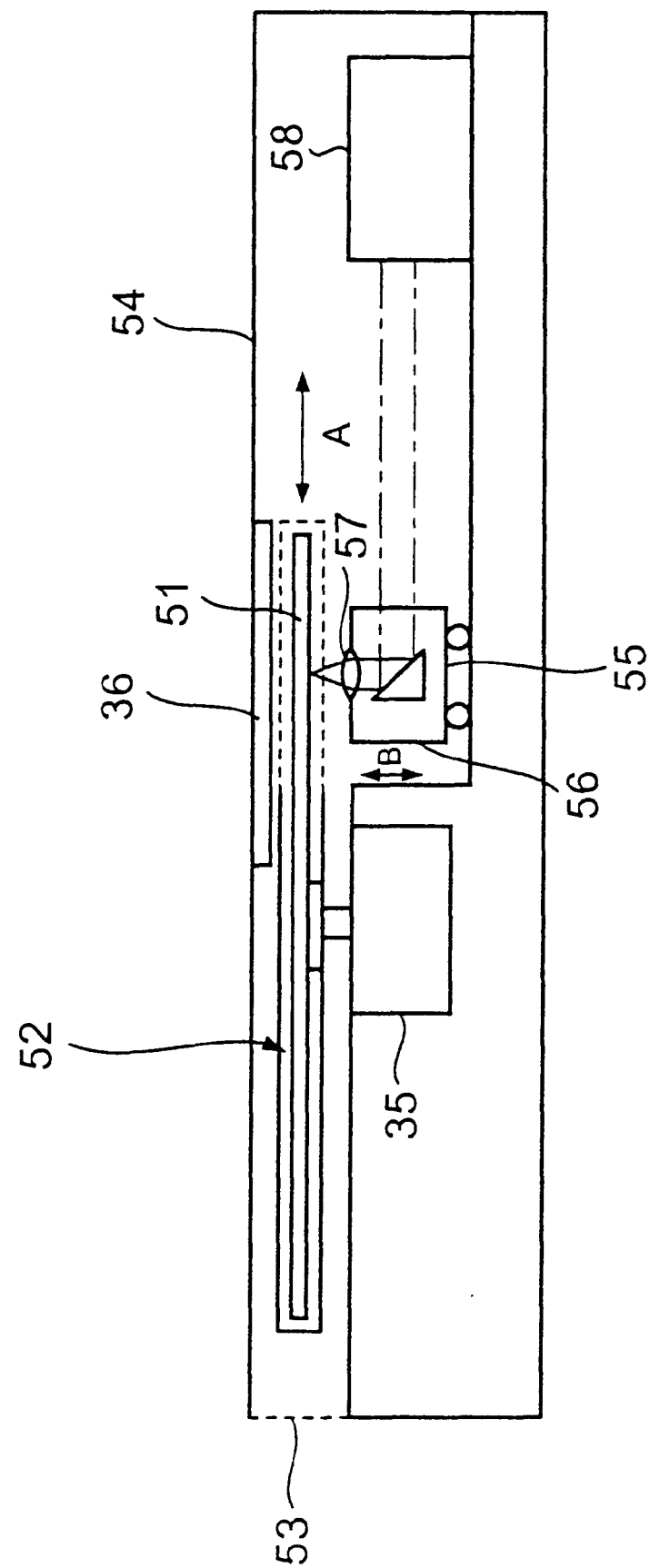
FIG. 2 is a schematic view of the inside of the enclosure of the information storage apparatus of FIG. 1.

FIG. 2 is a schematic view of the inside of the enclosure of the information storage apparatus of FIG. 1.

An MO cartridge 52 accommodating an MO medium 51 is loaded into a housing 54 through an insertion opening 53.

The MO medium 51 engages the spindle motor 35 in the housing 54. In the housing 54, the shutter of the MO cartridge 52 is opened so as to expose the MO medium 51. The MO medium 51 is interposed between a carriage 55 and the magnetic field generating unit 36 in the housing 5.

The carriage 55 can move in the radial direction (indicated by the arrow A) of the MO medium 51 by the VCM 40. A prism 56 and an objective lens 57 are mounted on the carriage 55.

The prism 56 deflects a laser beam emitted from a fixed optical system 58 toward the MO medium 51.

The objective lens 57 converges the laser beam from the prism 56 onto the MO medium 51. The objective lens 57 is rocked in the direction of the arrow B by the focusing actuator 38 disposed on the carriage 55. Also, the objective lens 57 is rocked in the direction of the arrow A by the lens actuator 39 disposed on the carriage 55. The focusing actuator 38 rocks the objective lens 57 in the direction of the arrow B, thereby performing focusing control. The lens actuator 39 rocks the objective lens 57 in the direction of arrow A, thereby performing tracking control.

Although the tracking control is carried out by the VCM 40 and the lens actuator 39 in this embodiment, it is possible to perform the tracking control only with the VCM 40.

Figure 3:
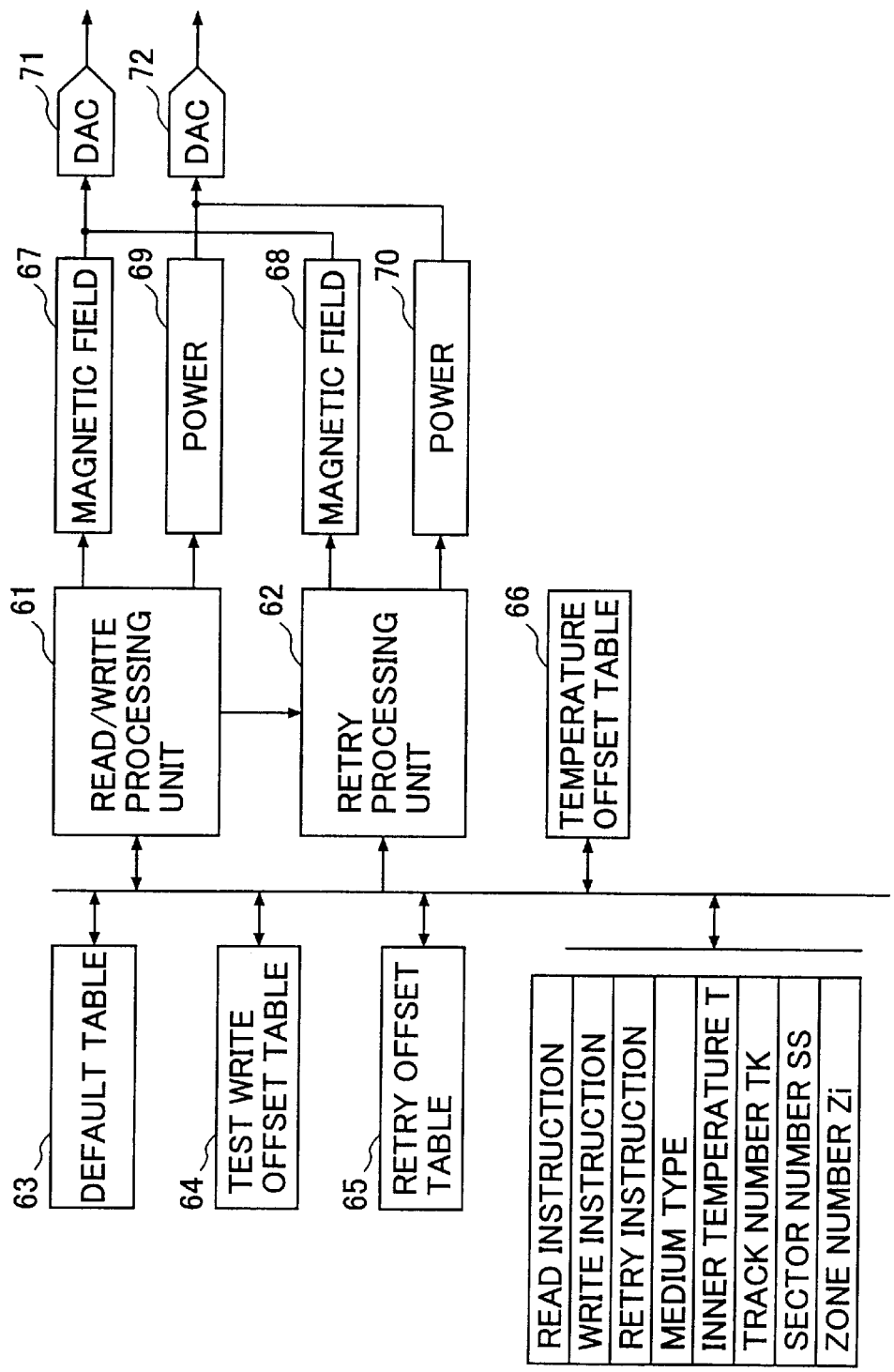
FIG. 3 is a functional block diagram for explaining a data write operation in accordance with the present invention.

Referring now to FIG. 3, a data write operation on the MO medium will be described below.

The functional blocks shown in FIG. 3 are realized by the MPU 13, the optical disk controller 14, and the write LSI 15.

The functional blocks for performing the data write operation include a read/writing processing unit 61, a retry processing unit 62, a default table 63, a test write offset table 64, a retry offset table 65, a temperature offset table 66, magnetic field set units 67 and 68, power set units 69 and 70, and digital/analog converters 71 and 72.

The read/writing processing unit 61 controls the data write operation. The retry processing unit 62 controls a retry process which is carried out with respect to an error generated during the data write operation.

The default table 63 stores the default values of an erase/write magnetic field, a read magnetic field, a write laser power, and a read laser power.

FIG. 4 shows the data structure of the default table 63.

As shown in FIG. 4, the default table 63 stores erase/write magnetic field default values H11 to H1n, read magnetic field default values H21 to H2n, write laser power default values PW1 to PWn, and read laser power default values PR1 to PRn.

In this embodiment, the erase/write magnetic field default values H11 to H1n and the read magnetic field default values H21 to H2n are set at a nominal value +α. The nominal value is a value obtained in a nominal state. In the nominal state, there is no mechanical tolerance, which is an ideal condition. The nominal value is set to a minimum required magnetic field.

The test write offset table 64 stores offset values for the erase/write magnetic field, the read magnetic field, the write laser power, and the read laser power, for a test write.

FIG. 5 shows the data structure of the test write offset table of the present invention.

As shown in FIG. 5, the test write offset table 64 stores offset values ΔH11 to ΔH1n of the erase/write magnetic field, offset values ΔH21 to ΔH2n of the read magnetic field, offset values ΔPW1 to ΔPWn of the write laser power, and offset values ΔPR1 to ΔPRn of the read laser power, for zones Z1 to Zn of the MO medium 51. The offset values ΔH11 to ΔH1n of the erase/write magnetic field are added to the default values H11 to H1n of the erase/write magnetic field when the test write is performed. The offset values ΔH21 to ΔH2n of the read magnetic field are added to the default values H21 to H2n when a test read is performed. The offset values ΔPW1 to ΔPWn of the write laser power are added to the default values PW1 to PWn of the write laser power. The offset values ΔPR1 to ΔPRn of the read laser power are added to the default values PR1 to PRn of the read laser power.

The retry offset table 65 stores offset values for a retry.

FIG. 6 shows the data structure of the retry offset table in the present invention.

The retry offset table 65 stores offset values ΔH31 to ΔH3m of the magnetic fields for the number of retries. The offset values ΔH31 to ΔH3m are added to the default values H11 to H1n of the erase magnetic field or the default values H21 to H2n of the write magnetic field, depending on the number of retries.

A temperature offset table 66 stores magnetic field offset values in accordance with the temperature inside the apparatus.

FIG. 7 shows the data structure of the temperature offset table of the present invention.

The temperature offset table 66 stores magnetic field offset values ΔH41 to ΔH46 of the magnetic field in accordance with the temperature ranges. The offset values ΔH41 to ΔH46 are added to the default values H11 to H1n of the erase magnetic field or the default values H21 to H2n of the write magnetic field, depending on the temperature.

In the magnetic field set unit 67, the read/writing processing unit 61 sets the erase/write magnetic field and the read magnetic field. More specifically, in accordance with a write instruction, the type of medium, the temperature inside the apparatus, and the zone number, the read/writing processing unit 61 refers to the default table 63, the test write offset table 64, and the temperature offset table 66, thereby determining the erase/write magnetic field and the read magnetic field. The read/writing processing unit 61 then sets the erase/write magnetic field and the read magnetic field in the magnetic field set unit 67.

In the magnetic field set unit 68, the retry processing unit 62 sets the erase magnetic field and the write magnetic field. More specifically, based on the number of retries, the retry processing unit 62 refers to the retry offset table 65, thereby determining the erase magnetic field and the write magnetic field, which are then set in the magnetic field set unit 68.

In the power set unit 69, the read/writing processing unit 61 sets the laser power. More specifically, in accordance with a read instruction, the type of medium, the temperature inside the apparatus, and the zone number, the read/writing processing unit 61 refers to the default table 63, the test write offset table 64, and the temperature offset table 66, so as to determine the laser power, which is then set in the power set unit 69.

In the power set unit 70, the retry processing unit 62 sets the laser power. More specifically, in accordance with a read instruction, a write instruction, the type of medium, the temperature inside the apparatus, and the zone number, the power set unit 70 refers to the retry offset table 65, so as to determine the laser power, which is then set in the power set unit 70.

The digital/analog converter 71 converts the magnetic fields set in the magnetic field set units 67 and 68 into analog signals. The digital/analog converter 72 converts the laser power set in the power set units 69 and 70 into analog signals.

Figure 8:
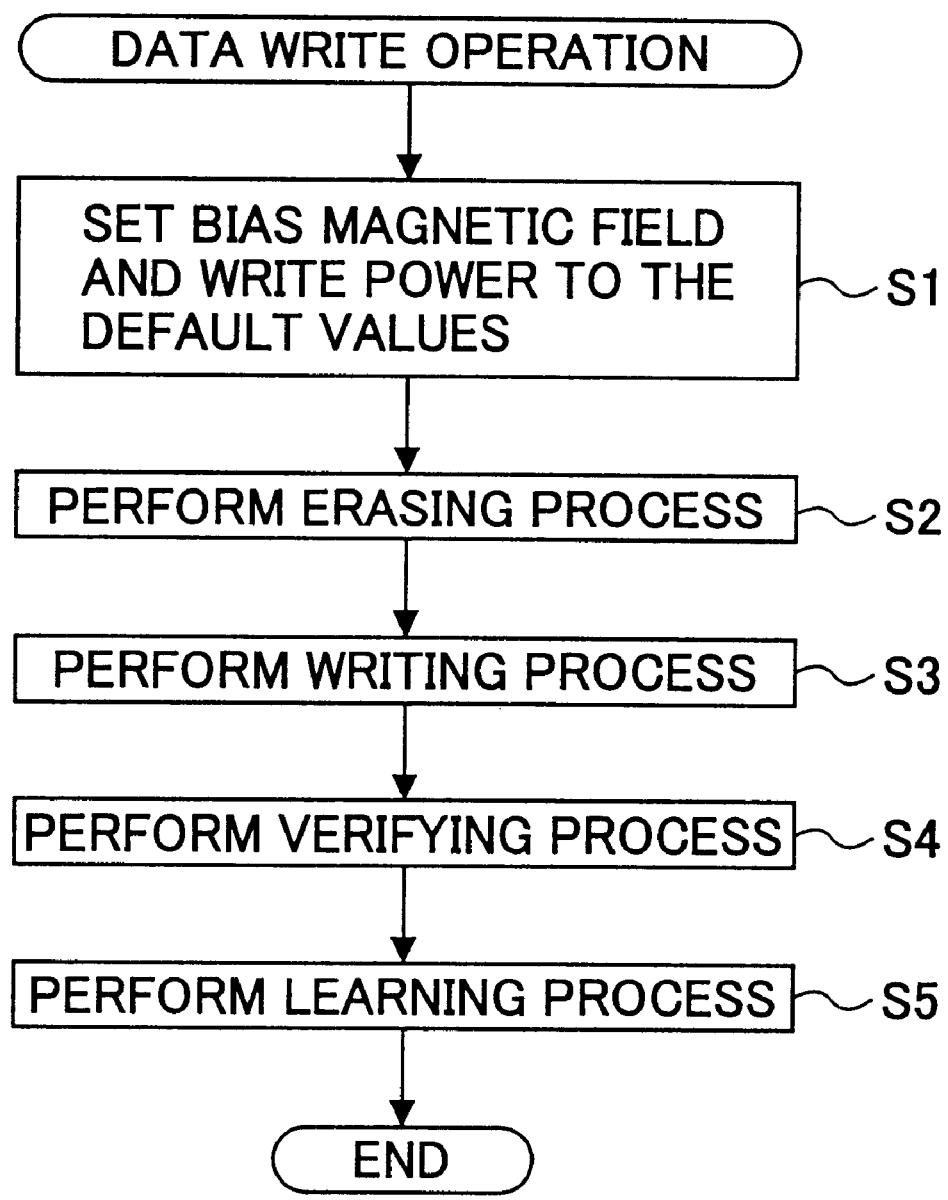
FIG. 8 is a flowchart of a data write v operation in one embodiment of the present invention.

Next, the data write operation will be described in detail. FIG. 8 is a flowchart of the data write operation in accordance with the present invention.

The data write operation comprises steps S1 to S5. In step S1, the bias magnetic field and the write power are set to the default values.

In step S2, an erasing process is performed. In step S3, a writing process is performed. In step S4, a verifying process is performed. In step S5, a write learning process is performed.

Figure 9:
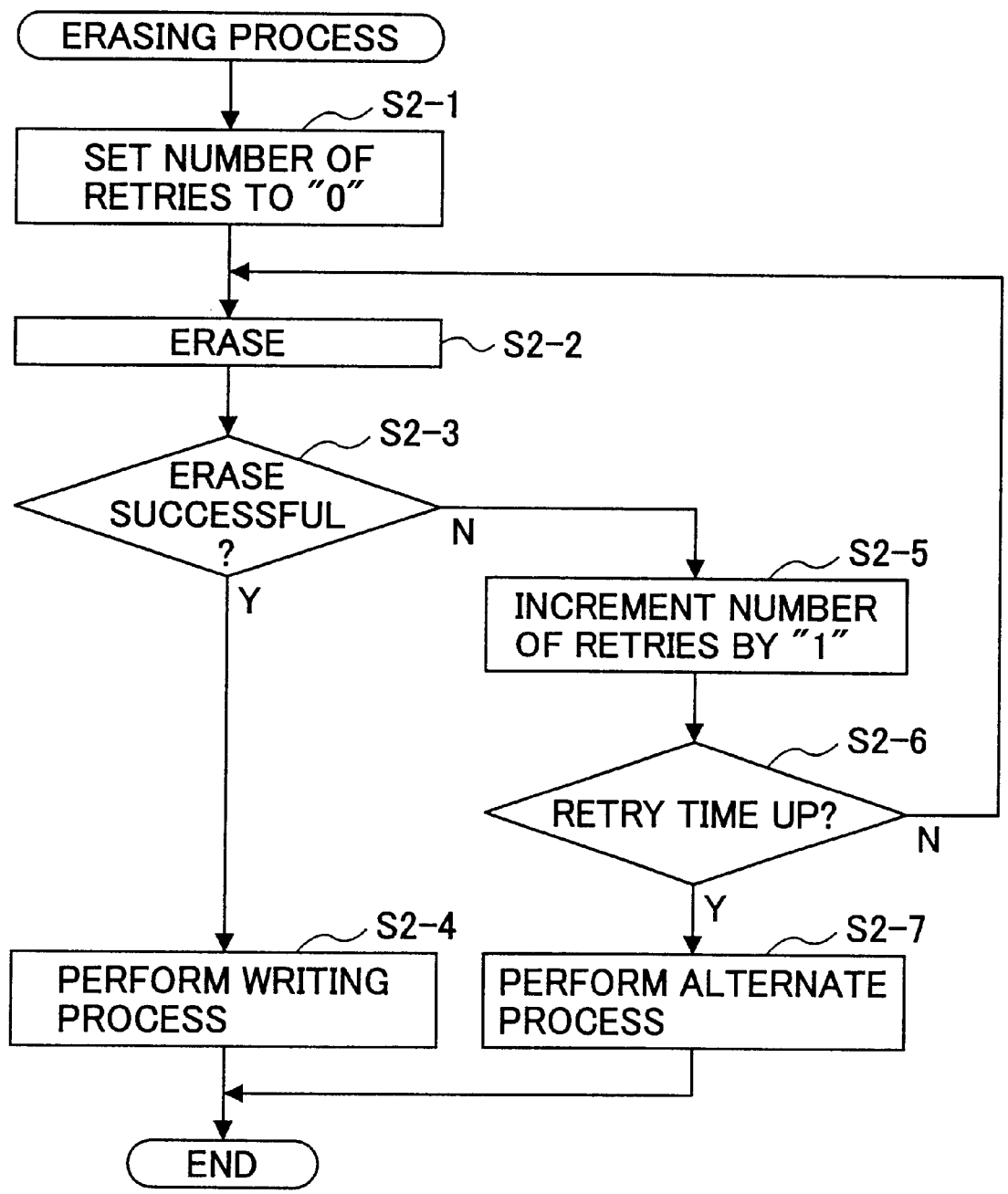
FIG. 9 is a flowchart of an erasing process in one embodiment of the present invention.

The erasing process of step S2 will be described below in greater detail. FIG. 9 is a flowchart of the erasing process in accordance with the present invention.

The erasing process of step S2 comprises steps S2-1 to S2-7. In step S2-1, the number of retries is set to "0". In step S2-2, the erasing is carried out.

In step S2-3, it is determined whether or not the erasing has been successfully carried out. More specifically, in step S2-3, an error generated during the erasing in step S2-2 is monitored, and if no error occurs, it is determined that the erasing has been successfully completed. If an error occurs, it is determined that the erasing has failed.

If the erasing is successfully completed in step S2-3, the operation moves on to step S2-4. In step S2-4, the writing process of step S3 is started.

If the erasing fails in step S2-3, the operation moves on to step S2-5. In step S2-5, the number of retries is incremented by "1".

In step S2-6, the number of retries that have been performed is monitored. When the number of retries that have been performed exceeds a predetermined value, it is determined that the retry time is up. If it is determined that the retry time is up in step S2-6, the operation moves on to step S2-7.

In step S2-7, an alternate process is performed. In the alternate process, a sector in which the retry time is up is replaced by alternate sector. Replaced sectors and replacing alternate sectors are managed in the form of a list.

If the retry time is not up in step S2-6, the operation returns to step S2-2, and the erasing is again carried out.

Figure 10:
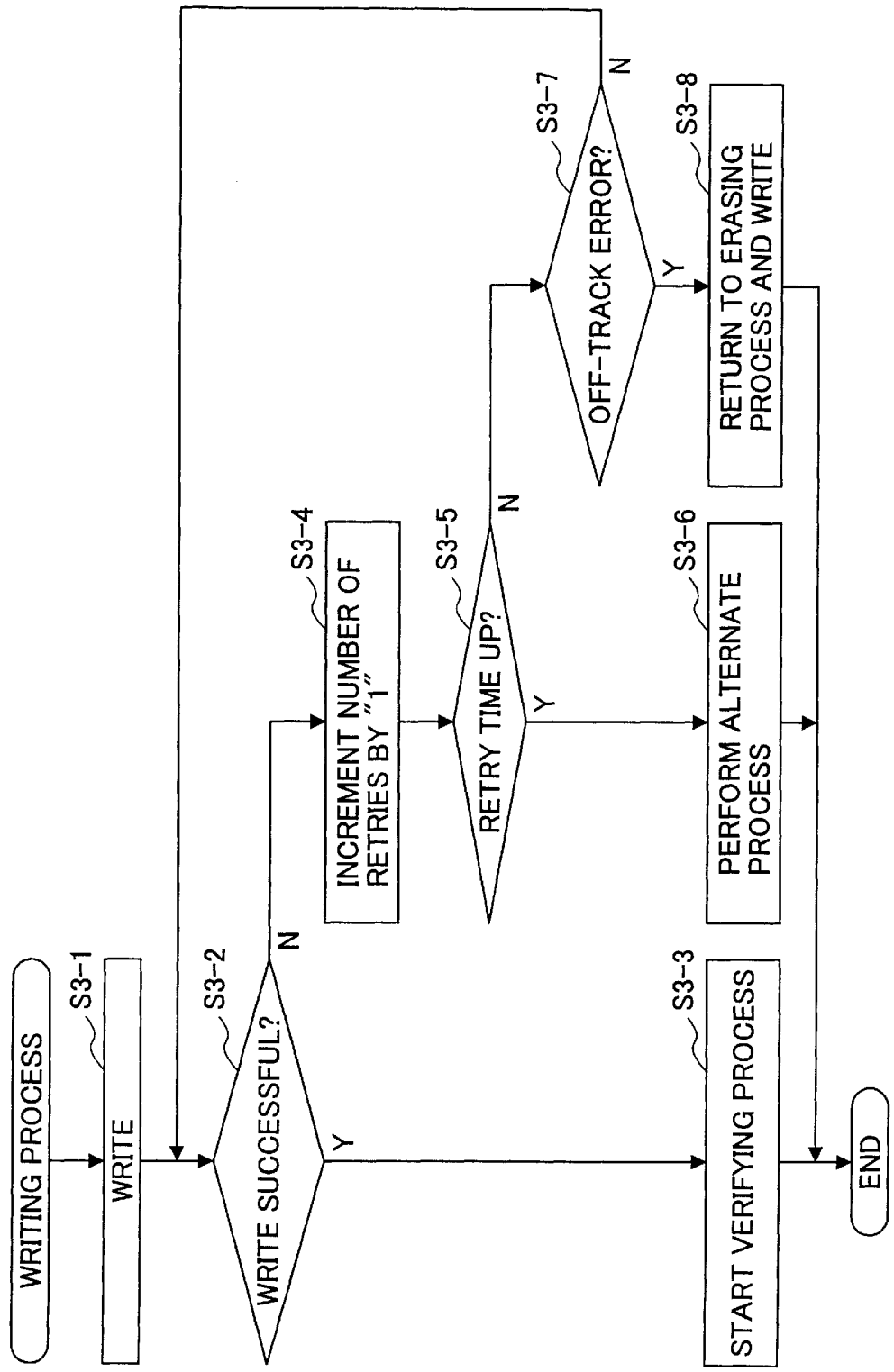
FIG. 10 is a flowchart of a data writing process in one embodiment of the present invention.

Next, the writing process of step S3 will be described below. FIG. 10 is a flowchart of the writing process in accordance with the present invention.

The writing process of step S3 comprises steps S3-1 to S3-8.

In step S3-1, data writing is carried out. In step S3-2, it is determined whether or not the data writing has been successfully completed in step S3-1. More specifically, in step S3-2, an error generated while the data writing is monitored, and if no error occurs by the end of the data writing, it is determined that the data writing has been successfully completed. In this case, the operation moves on to step S3-3. In step S3-3, the verifying process of step S4 is started.

On the other hand, if the data writing is not successful, the operation moves on to step S3-4. In step S3-4, the number of retries that have been performed is incremented by "1".

In step S3-5, it is determined whether or not the retry time is up. More specifically, in step S3-5, the number of retries that have been performed is monitored. When the number of retries that have been performed exceeds the predetermined value, it is determined that the retry time is up. As long as the number of retries that have been performed is smaller than the predetermined value, it is determined that the retry time is left.

If it is determined that the write retry time is up in step S3-5, the operation moves on to step S3-6. In step S3-6, an alternate process that is the same as the alternate process of step S2-7 is performed.

If it is determined that the write retry time is left in step S3-5, the operation moves on to step S3-7. In step S3-7, it is determined whether or not the failure of the writing process is caused by an off-track error.

If it is determined in step S3-7 that the failure of the writing process is due to an off-track error, the operation moves on to step S3-8. In step S3-8, the operation returns to the erasing process of step S2. If it is determined in step S3-7 that the failure of the writing process is not due to an off-track error, the operation returns to step S3-2.

Figure 11:
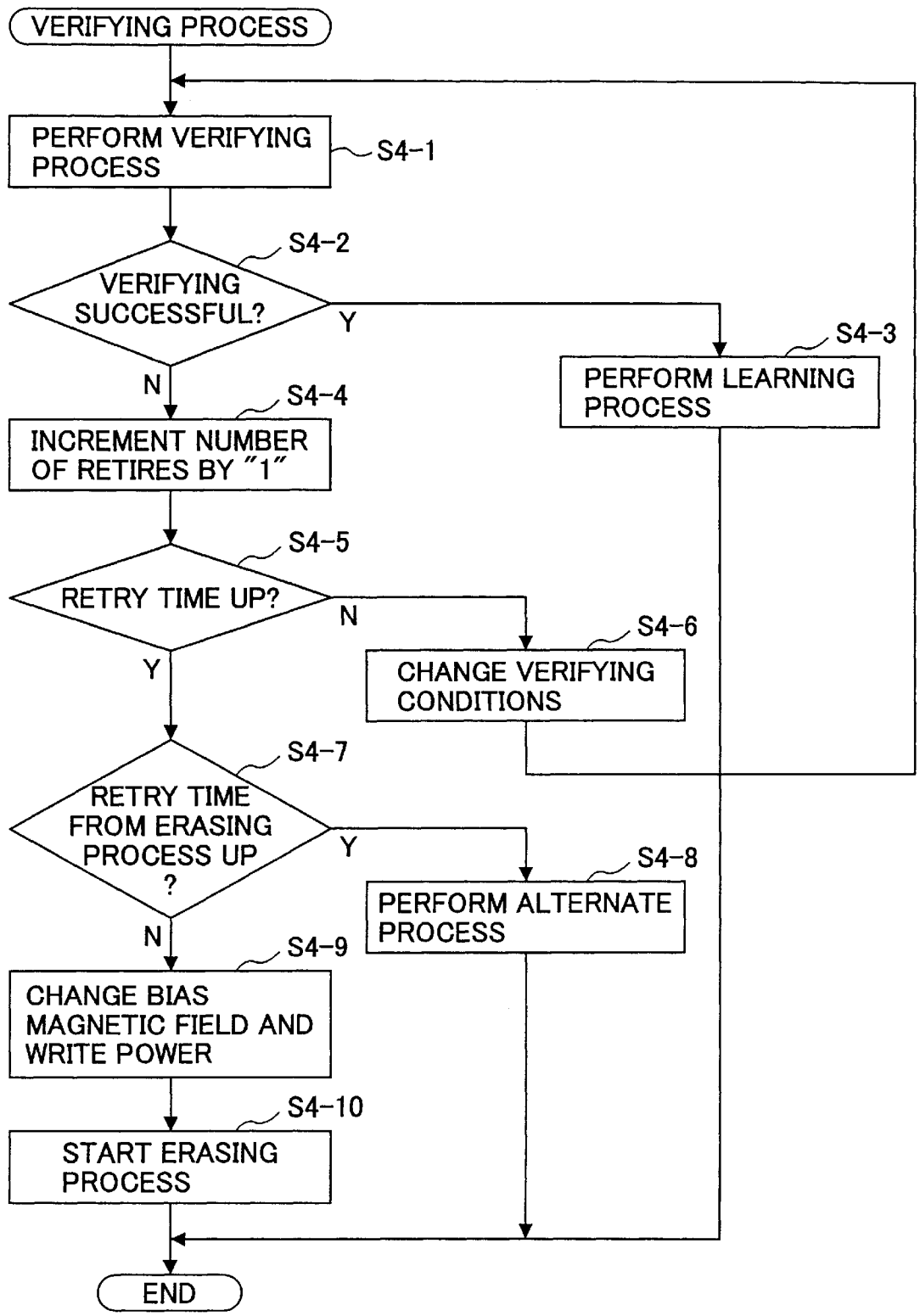
FIG. 11 is a flowchart of a verifying process in one embodiment of the present invention.

Next, the verifying process of step S4 will be described. FIG. 11 is a flowchart of the verifying process of the present invention.

The verifying process comprises steps S4-1 to 4-10. In step S4-1, verification is carried out. In step S4-2, it is determined whether or not the verification has been successfully completed in step S4-1. More specifically, in step S4-2, an error generated during the verification is monitored. If no error occurs, it is determined that the verification is successfully completed. If an error occurs, it is determined that the verification has failed.

If it is determined that the verification is successfully completed in step S4-2, the operation moves on to step S4-3. In step S4-3, a learning process that will be described later is started.

If it is determined that the verification has been failed in step S4-2, the operation moves on to step S4-4. In step 4-4, the number of verification retries that have been performed is incremented by "1".

In step S4-5, it is determined whether or not the retry time is up. More specifically, in step S4-5, the number of verification retries that have been performed is monitored. If the number of verification retries that have been performed exceeds a predetermined value, it is determined that the retry time is up. If the number of verification retries that have been performed is smaller than the predetermined value, it is determined that the retry time is left.

If it is determined in step S4-5 that the retry time is still left, the operation moves on to step S4-6. In step S4-6, the verifying conditions are changed. In step S4-6, various parameters such as reproduction beam power and magnetic field strength are changed. After the change of the verifying conditions in step S4-6, the operation returns to step S4-1, in which the verification is again performed.

On the other hand, if it is determined in step S4-5 that the retry time is up, the operation moves on to step S4-7. In step S4-7, it is determined whether or not the erasing process causes the retry time-up.

If it is determined in step S4-7 that the retry time-up is caused by the erasing process, the operation moves on to step S4-8. In step S4-8, an alternate process that is the same as the alternate process of step S2-7 is performed.

If it is determined in step S4-7 that the retry time-up is not caused by the erasing process, the operation moves on to step S4-9. In step S4-9, the bias magnetic field and the write power are changed. After the change of the bias magnetic field and the write power in step S4-9, the operation moves on to step S4-10. In step S4-10, the erasing process of step S2 is again started.

Next, the learning process of step S4-3 will be described. In the following description, the learning process is described for a case where a transition is made from the erase operation to the learning operation. However, the learning process may be performed for the erase operation, the write operation, and the read operation. Accordingly the learning process is not limited to the learning of the erase/write magnetic field and the erase/write power, but also for the learning of the read magnetic field and the read power.

Figure 12:
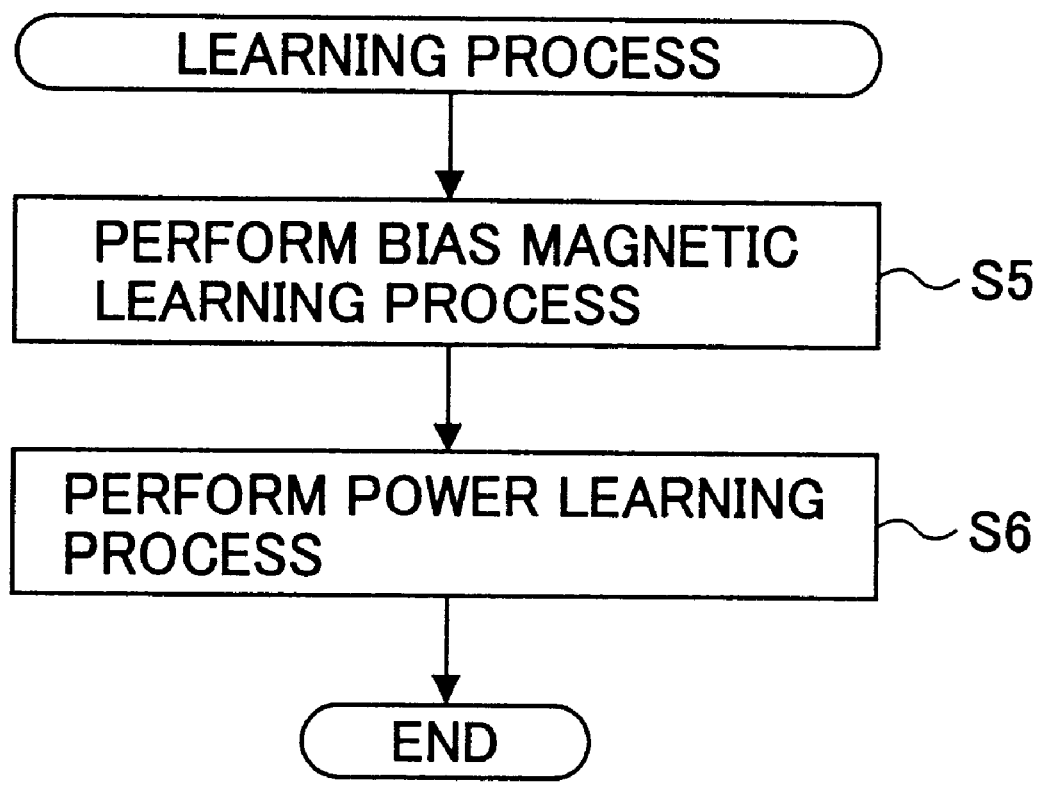
FIG. 12 is a flowchart of a learning process in one embodiment of the present invention.

FIG. 12 is a flowchart of the learning process of the present invention.

The learning process comprises steps S5 and S6. In step S5, a bias magnetic field learning process is performed. In the bias magnetic field learning process, the bias magnetic field strengths at the time of reading, erasing, and writing are learned.

In step S6, a power learning process is performed. In the power learning process, the laser powers at the time of reading, erasing, and writing are learned.

Figure 13:
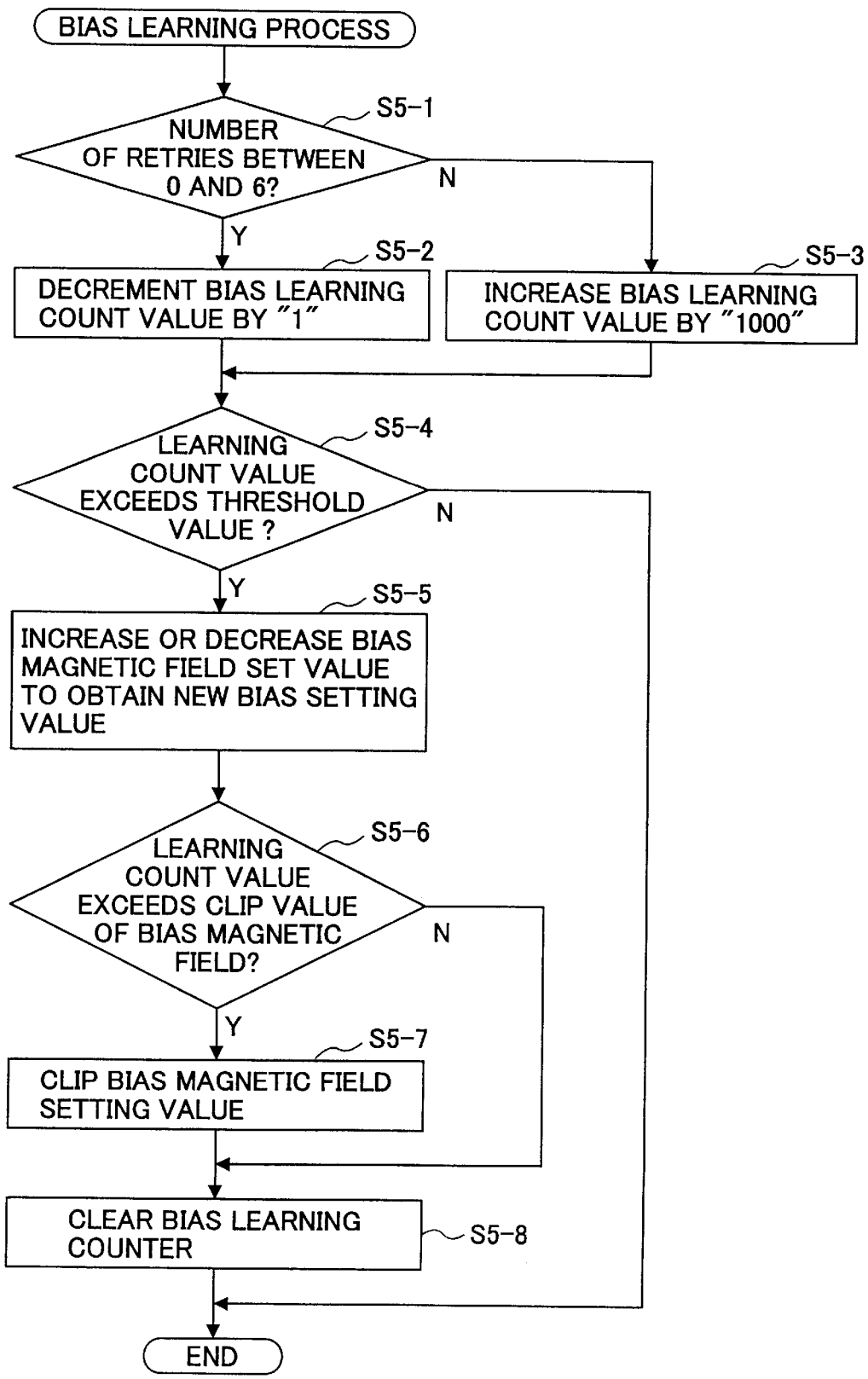
FIG. 13 is a flowchart of a bias magnetic field learning process in one embodiment of the present invention.

Next, the bias magnetic field learning process of step S5 will be described. FIG. 13 is a flowchart of the bias magnetic field learning process in accordance with the present invention.

The bias magnetic learning process of step S5 comprises steps S5-1 to S5-8.

In step S5-1, it is determined whether or not the number of retries that have been performed is in the range of 0 to 6. If it is determined in step S5-1 that the number of retries that have been performed is in the range of 0 to 6, i.e., the number of errors that have occurred is relatively small, the operation moves on to step S5-2. In step S5-2, the bias learning count value is decreased by "1".

On the other hand, if it is determined in step S5-1 that the number of retries that have been performed is 7 or larger, i.e., the number of errors that have occurred is large, the operation moves on to step S5-3. In step S5-3, the bias learning count value is increased by "1000".

In step S5-4, it is determined whether or not the learning count value is larger than a threshold value, such as "3000". The threshold value can be set with respect to both the positive side and the negative side, but no subtraction should be made from the initial value of the default value.

If it is determined in step S5-4 that the learning count value is equal to or smaller than the threshold value, the operation ends. On the other hand, if it is determined in step S5-4 that the learning count value is larger than the threshold value, the operation moves on to step S5-5. Here, the threshold value is set with respect to both the positive side and the negative side.

In step 5-5, a bias magnetic field setting value is increased or decreased to obtain a new bias setting value. If the learning count value exceeds the threshold value on the positive side in step S5-5, the bias magnetic field setting value is increased. On the other hand, if the learning count value exceeds the threshold value on the negative side in step S5-5, the bias magnetic field setting value is decreased.

In step S5-5, the bias magnetic field setting value is increased or decreased by an offset value which is approximately 10% of the default value, for instance. This is approximately a half of a clip value that will be decreased later. The offset value by which the bias magnetic setting value is increased and decreased may be different.

In step S5-6, it is determined whether or not the bias magnetic field exceeds a predetermined clip value. The clip value is a value that is estimated with the worst conditions of the mechanism being taken into consideration. If it is determined in step S5-6 that the bias magnetic field exceeds the clip value, the operation moves on to step S5-7. In step S5-7, the bias magnetic field setting value is clipped to the predetermined clip value.

In step S5-8, the bias counter is cleared. If it is determined in step S5-6 that the bias magnetic field does not exceed the predetermined clip value, the operation moves on to step S5-8. The operation then comes to an end.

Figure 14:
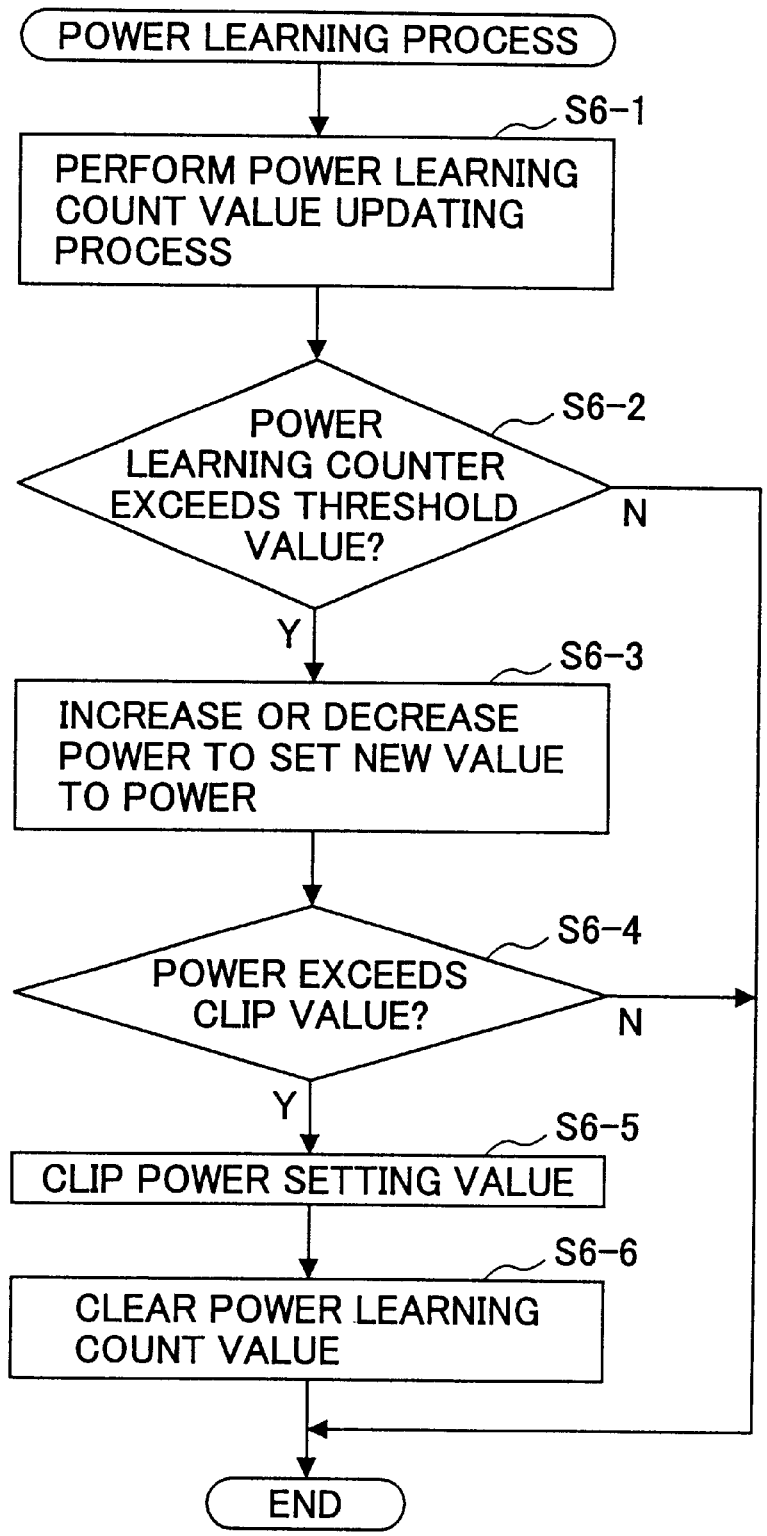
FIG. 14 is a flowchart of a power learning process in one embodiment of the present invention.

Next, the power learning process of step S6 will be described. FIG. 14 is a flowchart of the power learning process of the present invention.

The power learning process comprises steps S6-1 to S6-6. In step S6-1, the power learning count value is updated. This step of updating the power learning count value will be described later in detail. After the updating of the power learning count value, the operation moves on to step S6-2.

In step S6-2, it is determined whether or not the power learning count value exceeds the threshold value. If it is determined in step S6-2 that the power learning count value does not exceed the threshold value, the operation ends. On the other hand, if it is determined in step S6-2 that the power learning count value exceeds the threshold value, the operation moves on to step S6-3. In step S6-3, the power setting value is increased so as to obtain a larger power setting value. In step S6-4, it is determined whether or not the increased power setting value set in step S6-3 exceeds a predetermined clip value.

If it is determined in step S6-4 that the power setting value exceeds the clip value, the operation moves on to step S6-5. In step S6-5, the power setting value is clipped to the clip value. In step S6-6, the power learning count value is cleared.

Figure 15:
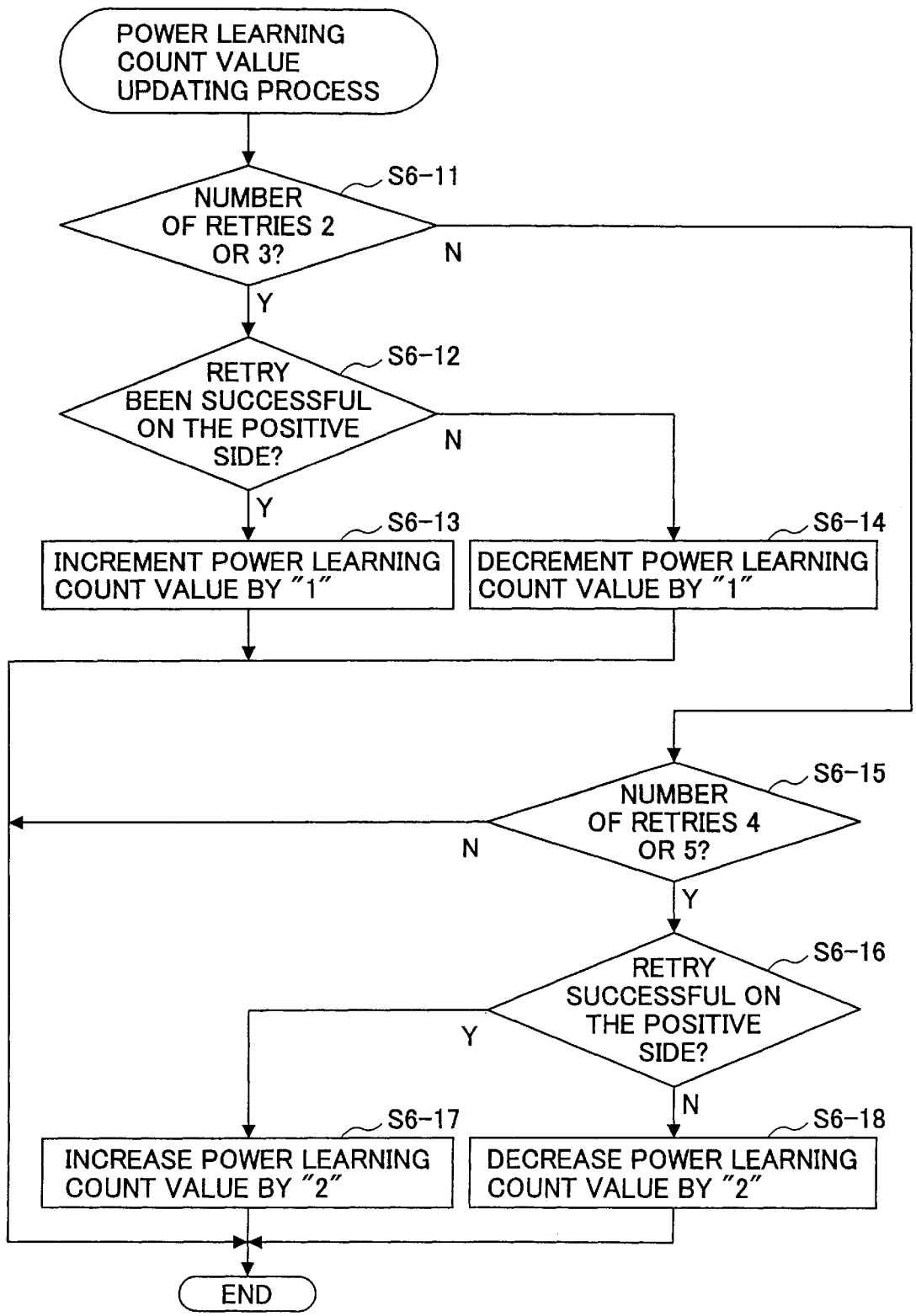
FIG. 15 is a flowchart of a power learning count value updating process in one embodiment of the present invention.

Next, the process of updating the power learning count value of step S6-1 will be described in detail. FIG. 15 is a flowchart of the process of updating the power learning count value in accordance with the present invention.

The power learning count value updating process of step S6-1 comprises steps S6-11 to S6-18.

In step S6-11, it is determined whether or not the number of retries that have been performed is 2 or 3. If it is determined in step S6-11 that the number of retries that have been performed is 2 or 3, the operation moves on to step S6-12. In step S6-12, it is determined whether or not a retry is successfully completed on the positive side.

If it is determined in step S6-12 that the retry is successfully completed on the positive side, the operation moves on to step S6-13. In step S6-13, the power learning count value is incremented by "1".

On the other hand, if it is determined in step S6-12 that the retry is not successfully completed on the positive side, the operation moves on to step S6-14. In step S6-14, the power learning count value is decremented by "1".

In the above manner, the updating of the power learning count value is completed when the number of retries that have been performed is 2 or 3.

Meanwhile, if it is determined in step S6-11 that the number of retries that have been performed is neither 2 nor 3, the operation moves on to step S6-15. In step S6-15, it is determined whether or not the number of retries that have been performed is 4 or 5.

If it is determined in step S6-15 that the number of retries that have been performed is 4 or 5, the operation moves on to step S6-16. In step S6-16, it is determined whether or not a retry is successfully completed on the positive side.

If it is determined in step S6-16 that the retry is successfully completed, the operation moves on to step S6-17. In step S6-17, the power learning count value is increased by "2".

If it is determined in step S6-16 that the retry is not successfully completed, the operation moves on to step S6-18. In step S6-18, the power earning count value is decreased by "2". Here, if the retry is successfully completed on the positive side, it is determined that the retry is successful on the increasing side for the power learning count value. On the other hand, if the retry is successfully completed on the negative side, it is determined that the retry is successful on the decreasing side for the power learning count value.

In the above manner, the power learning count value is updated.

By the above processes, the default values of the bias magnetic fields are updated.

In accordance with this embodiment, it is not necessary to set the bias magnetic field to the maximum value, which takes the mechanical tolerance into consideration. Thus, various processes can be performed with the optimum value of the bias magnetic field, and the power consumption can be reduced accordingly.

Figure 16:
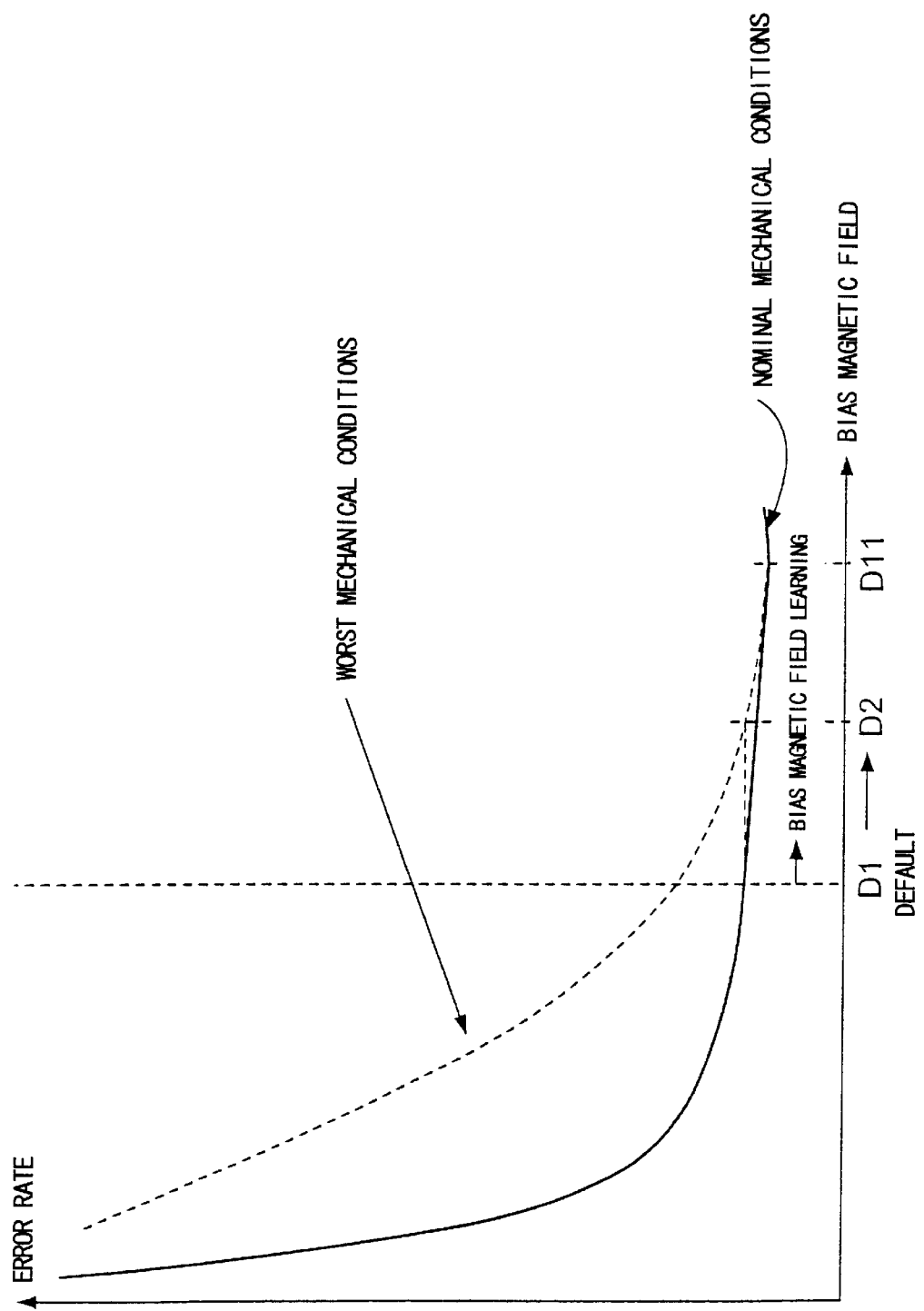
FIG. 16 shows error rate characteristics with respect to a magnetic field in one embodiment of the present invention.

FIG. 16 shows error rate characteristics with respect to magnetic fields in one embodiment of the present invention.

In FIG. 16, the solid line indicates the characteristics of a case where the mechanical tolerance of the apparatus is a minimum, and the broken line indicates the erase/write characteristics of a case where the mechanical tolerance of the apparatus is a maximum (worst case).

In this embodiment, a default value D1 of the bias magnetic field is set in the vicinity of the magnetic field that becomes a minimum when the mechanical tolerance is a minimum as indicated by the solid line in FIG. 16. On the other hand, when the mechanical tolerance is a maximum, the error rate is large, and the apparatus does not operate properly with the default value D1, as indicated by the broken line. However, by the bias magnetic field learning processes, the default value is adjusted to gradually approach an optimum value D2, so as to accurately perform the erasing process and to correctly perform the writing process. In the prior art, on the other hand, the bias magnetic field is set to a maximum value D11 by taking the worst mechanical tolerance into consideration.

Although the magneto-optical disk apparatus is employed as the information storage apparatus in this embodiment, the information storage apparatus of the present invention is not limited to the magneto-optical disk apparatus, and is applicable to any type of apparatus which records information by applying a magnetic field.

In this embodiment, the default table 63 and the offset table 64 manage the default values and offset values for each zone, but they may manage those values for each area of the disk medium.

FIG. 17 shows the data structure of a modification of the default table of the present invention. FIG. 18 shows the data structure of a modification of the offset table of the present invention.

As shown in FIG. 17, a default table 63 stores default values H11 to H1n of the erase/write (E/W) magnetic field, default values H21 to H2n of the read (R) magnetic field, default values PW1 to PWn of the write laser power, and default values PR1 to PRn of the read laser power, for areas A1 to An. It should be understood that the areas A1 to An are regions that are defined by dividing the recording surface of the magneto-optical disk medium into a plurality of parts in the radial direction and the circumferential direction.

As shown in FIG. 18, an offset table 64 stores offset values $\Delta H11$ to $\Delta H1n$ of the erase/write (E/W) magnetic field, offset values $\Delta H21$ to $\Delta H2n$ of the read (R) magnetic field, offset values $\Delta PW1$ to $\Delta PWn$ of the write laser power, and offset values $\Delta PR1$ to $\Delta PRn$ of the read laser power, for the areas A1 to An. By managing the default values and the initial offset values for the respective areas, a precise control operation can be performed.

Also, the updating may be performed not only when a retry is carried out, but also when a temperature change occurs or every time a predetermined period of time passes.

The control range of the magnetic field is from a default value to a clip value. When the default value is updated, the control range of the magnetic field changes to a range from the new updated default value to the clip value. Accordingly, the control range can be gradually narrowed, so as to quickly obtain the optimum value.

In a magnetic super resolution (MSR) recording system which carries out a read process using a magnetic field, it is also possible to set default values in the same manner as described above.

The present invention is not limited to the specifically disclosed embodiments, but variations and modifications may be made without departing from the scope of the present invention.

The present application is based on Japanese patent application No. 2000-205284, filed on Jul. 6, 2000, the entire contents of which are hereby incorporated by reference.

What is claimed is:

1. An information storage apparatus which carries out a recording to record information on a recording medium magneto-optically by applying a recording magnetic field to the recording medium, comprising:
   a magnetic field generating unit that applies a magnetic field to the recording medium;
   a magnetic control unit that specifies a control value for controlling a magnitude of the magnetic field generated by the magnetic field generating unit to a value within a control range of recording magnetic field of the magnetic field generating unit;
   a storage unit that stores an initial value of the control value, said initial value being a minimum value of the control value within the control range, the minimum value being a value obtained in a nominal state;
   a detection unit that detects a write error during the recording; and
   an updating unit that updates the initial value to a new control value within the control range depending on the write error detected by said detection unit.

2. The information storage apparatus as claimed in claim 1, further comprising a counter unit that counts a number of retries performed,
   wherein the updating unit updates the control value depending on the number of retries performed that are counted by the counter unit.

3. The information storage apparatus as claimed in claim 1, wherein the updating unit stores the control value in the storage unit for each region of the recording medium or for each temperature in said information storage apparatus.

4. The information storage apparatus as claimed in claim 1, wherein the updating unit obtains the new control value by adding a predetermined value to or subtracting the predetermined value from the updated control value.

5. The information storage apparatus as claimed in claim 4, wherein the updating unit does not subtract the predetermined value from the control value when the control value is the initial value at the time of updating.

6. The information storage apparatus as claimed in claim 1, wherein:
   said recording carried out with respect to the recording medium includes an erase process, a recording process and a verify process; and
   said detection unit detects the error based on a number of retries in at least one of the erase process, the recording process and the verify process.

7. A method of magneto-optically carrying out a recording to record information on a recording medium in an information storage apparatus, comprising the steps of:
   applying a magnetic field from a magnetic field generating unit to the recording medium;
   detecting a write error during the recording; and
   updating an initial value of a control value for controlling a magnitude of the magnetic field within a control range of a recording magnetic field of the magnetic field generating unit to a new control value depending on the write error detected by said detecting step, said initial value being a minimum value of the control value within the control range, the minimum value being a value obtained in a nominal state.

8. The method as claimed in claim 7, further comprising the steps of:
   monitoring a number of retries performed; and
   updating the control value depending on the number of retries performed monitored by said monitoring step.

9. The method as claimed in claim 7, further comprising the step of:
   storing the control value for a plurality of regions of the recording medium or for a plurality of temperatures within the information storage apparatus.

10. The method as claimed in claim 7, wherein, the step of updating the initial value of the control value, further controls the magnitude of the magnetic field within a control range of an erase magnetic field, or a reproducing magnetic field, and
    the recording magnetic field, and the erase magnetic field, or the reproduction field are updated.

11. The method as claimed in claim 7, further comprising the step of:
    obtaining a new control value by adding a predetermined value to or subtracting the predetermined value from the control value, when the control value is already updated.

12. The method as claimed in claim 11, wherein the step of obtaining a new control value does not subtract the predetermined value from the control value when the control value is the initial value at the time of updating.

13. The method as claimed in claim 7, wherein:
    said recording carried out with respect to the recording medium includes an erase process, a recording process and a verify process; and
    said detecting step detects the error based on a number of retries in at least one of the erase process, the recording process and the verify process.

14. An information storage apparatus which carries out an erasure to erase information from a recording medium magneto-optically by applying an erasing magnetic field to the recording medium, comprising:
    a magnetic field generating unit that applies a magnetic field to the recording medium;

a magnetic control unit that specifies a control value for controlling a magnitude of the magnetic field generated by the magnetic field generating unit to a value within a control range of the erasing magnetic field of the magnetic field generating unit;

a storage unit that stores an initial value of the control value, said initial value being a minimum value of the control value within the control range, the minimum value being a value obtained in a nominal state;

a detection unit that detects an erase error during the erasure; and an updating unit that updates the initial value to a new control value within the control range depending on the erase error detected by said detection unit.

15. A method of magneto-optically carrying out an erasure to erase information from a recording medium in an information storage apparatus, comprising the steps of:

applying a magnetic field from a magnetic field generating unit to the recording medium;

detecting an erase error during the erasure; and updating an initial value of a control value for controlling a magnitude of the magnetic field within a control range of an erasing magnetic field of the magnetic field generating unit to a new control value depending on the erase error detected by said detecting step, said initial value being a minimum value of the control value within the control range, the minimum value being a value obtained in a nominal state.

16. An information storage apparatus which carries out a reproduction to reproduce information from a recording medium magneto-optically by applying a reproducing magnetic filed to the recording medium, comprising:

a magnetic field generating unit that applies a magnetic field to the recording medium;

a magnetic control unit that specifies a control value for controlling a magnitude of the magnetic field generated by the magnetic field generating unit to a value within a control range of the reproducing magnetic field of the magnetic field generating unit;

a storage unit that stores an initial value of the control value, said initial value being a minimum value of the control value within the control range, the minimum value being a value obtained in a nominal state;

a detection unit that detects a read error during the reproduction; and an updating unit that updates the initial value to a new control value within the control range depending on the read error detected by said detection unit.

17. A method of magneto-optically carrying out a reproduction to reproduce information from a recording medium in an information storage apparatus, comprising the steps of:

applying a magnetic field from a magnetic field generating unit to the recording medium;

detecting a read error during the reproduction; and updating an initial value of a control value for controlling a magnitude of the magnetic field within a control range of a reproducing magnetic field of the magnetic field generating unit to a new control value depending on the read error detected by said detecting step, said initial value being a minimum value of the control value within the control range, the minimum value being a value obtained in a nominal state.

* * * * *